United States Patent [19]

Wasson

[11] Patent Number: 5,731,406

[45] Date of Patent: Mar. 24, 1998

[54] MACROMONOMER PREPARATION

[75] Inventor: Robert Craig Wasson, Barnston, England

[73] Assignee: Solvay Interox Limited, Warrington, England

[21] Appl. No.: 663,206

[22] PCT Filed: Dec. 16, 1994

[86] PCT No.: PCT/GB94/02748

§ 371 Date: Jun. 12, 1996

§ 102(e) Date: Jun. 12, 1996

[87] PCT Pub. No.: WO95/18170

PCT Pub. Date: Jul. 6, 1995

[30] Foreign Application Priority Data

Dec. 29, 1993 [GB] United Kingdom ............... 9326511

[51] Int. Cl.$^6$ .................................................. C08G 63/10
[52] U.S. Cl. ........................ 528/357; 528/354; 528/355; 528/361

[58] Field of Search ................................. 528/354, 357, 528/355, 361; 560/179, 189

[56] References Cited

U.S. PATENT DOCUMENTS

| | | | |
|---|---|---|---|
| 3,655,631 | 4/1972 | Fraser et al. | 528/357 |
| 4,683,287 | 7/1987 | Koleske et al. | 528/354 |

*Primary Examiner*—P. Hampton-Hightower
*Attorney, Agent, or Firm*—Larson & Taylor

[57] ABSTRACT

A process for the preparation of macromonomers by reaction between a lactone and a hydroxyalkylacrylate in the presence of >200 ppm phosphoric acid catalyst is provided. The reaction takes place in the presence of a free radical inhibitor at a temperature of from 100° to 130° C. Preferably, the lactone is ε-caprolactone and the hydroxyalkylacrylate is selected from the group consisting of 2-hydroxyethylacrylate and 2-hydroxyethylmethacrylate.

11 Claims, No Drawings

MACROMONOMER PREPARATION

BACKGROUND OF THE INVENTION

This invention concerns a process for the preparation of macromonomers. More specifically, this invention concerns a process for preparing macromonomers by reaction of a lactone with a hydroxyalkylacrylate.

Lactones have found wide applicability as monomers in the preparation of many different polymers, particularly polyesters and polyurethanes. In addition, lactones can be used in the preparation of monomers containing a plurality of reactive sites. Such monomers are often referred to as macromonomers, and have found particular application in the preparation of cross-linked polymers and polymers where further chemical modification is desirable. Important examples of macromonomers result from the reaction between a lactone and a hydroxyalkylacrylate.

The reaction between a lactone and a hydroxyalkylacrylate requires the presence of a catalyst in order to achieve a commercially acceptable rate of reaction at a moderate temperature. Use of a moderate temperature is important not only for economic reasons but also because use of too high a temperature can cause extreme discolourisation of the macromonomer product.

In U.S. Pat. No. 3,655,631, strong organic carboxylic or sulphonic acids are proposed as catalysts. There is some concern that when these acids remain in the subsequently-produced polymer they could result in reduced shelf life of the polymer.

In UK Patent Application 2,101,121, tin dihalides are taught for use as catalysts for the reaction between lactones and a hydroxyalkylacrylates. Recently, there has been some concern over the toxicological properties of heavy metal compounds.

EP-A-0 108 372 teaches the use of a wide range of catalysts, including protonic acids at concentrations below 200 ppm in the reaction product although only tin compounds are exemplified. A repeat of example 1 of this application produced a gelled product having a high yellow colouration. This indicates that the processes taught in this application can be difficult to control because gelling is commonly caused by cross-linking of the macromonomer during its manufacture. Gelling is also undesirable because it renders the macromonomer intractable and unusable. Additionally, many of the applications in which macromonomers are employed, for example in the paints industry, require a substantially colourless product, so that the yellow colouration present would result in this product being unacceptable.

In Japanese patent application 61043623, perchloric acid is taught as a suitable catalyst. Perchloric acid, however, is extremely reactive and can readily form explosive mixtures with organic compounds, so it would be desirable to identify a catalyst that did not have such hazardous properties.

The processes of the prior art notwithstanding, it remains desirable to identify additional and further process for the production of macromonomers by the reaction of lactones with hydroxyalkylacrylates.

It is a first object of the present invention to provide a new or modified process for the production of macromonomers by the reaction of lactones with hydroxyalkylacrylates.

It is a second object of some or further aspects of the present invention to provide a process for the production of macromonomers by the reaction of lactones with hydroxyalkylacrylates that avoids or ameliorates the problems associated with the processes of the prior art.

SUMMARY OF THE INVENTION

According to the present invention, there is provided a process for the preparation of macromonomers by the catalysed reaction between a lactone and a hydroxyalkylacrylate, characterised in that the catalyst comprises phosphoric acid at a concentration of greater than 200 mg/kg, preferably greater than 250 mg/kg, of reaction mixture, and that the process is carried out at a temperature of from 100° C. to 130° C.

DESCRIPTION OF PREFERRED EMBODIMENTS

Although EP-A-0 108 372 names a number of possible catalysts for the reaction between a lactone and a hydroxyalkylacrylate, it does not specify phosphoric acid.

During the course of the studies leading to the present invention, it was surprisingly found that when phosphoric acid was employed as a catalyst for the reaction between a lactone and a hydroxyalkylacrylate at a concentration greater than the range for protonic acids recommended in EP-A-0 108 372, an easily controllable reaction occurred that enabled the production of a product having a markedly reduced yellow colouration compared with that of Example 1 of EP-A-0 108 372.

Phosphoric acid catalyst is employed in the process according to the present invention at a concentration of greater than 200 mg/kg, preferably greater than 250 mg/kg, of reaction mixture, It will be recognised that the actual concentration employed can vary widely, and will in many embodiments be selected considering other process factors, for example, the desired reaction rate and the desired reaction temperature. The concentration of phosphoric acid employed is unlikely to be greater than about 2000 mg/kg and is often preferably less than 1000 mg/kg of reaction mixture. In certain embodiments of the present invention, good results have been achieved employing a phosphoric acid concentration in the range of from 300 mg/kg to 750 mg/kg, and particularly from 400 to 600 mg/kg.

Lactones that can be employed in the process according to the present invention have the general chemical formula:

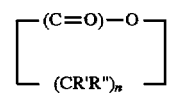

wherein R' and R" are independently hydrogen atoms or alkyl groups having up to 12 carbon atoms and n is from 3 to 7. Preferably the total number of carbons in R' and R" is 0 or 1 to 4. Particularly preferably, the lactone is ε-caprolactone.

Many hydroxyalkylacrylates that can be employed in the process according to the present invention have the general chemical formula:

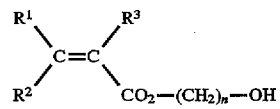

where $R^1$, $R^2$ and $R^3$ are independently hydrogen atoms, aryl groups or short chain alkyl groups having up to 4 carbon atoms, and n is an integer from 1 to 6, preferably from 2 to 4. Examples of such hydroxyalkylacrylates include 2-hydroxyethylacrylate, 2-hydroxyethylmethacrylate, 3-hydroxypropylacrylate, 3-hydroxypropylmethacrylate, 4-hydroxybutylacrylate and 4-hydroxybutylmethacrylate. Further hydroxyalkylacrylates that can be employed include those where the hydroxyl group is a secondary or tertiary hydroxyl group and/or the hydroxyalkyl group is substituted with one or more substituents including for example, additional hydroxyl groups, short chain alkyl groups and halogens. Examples of these further hydroxyalkylacrylates include 2-hydroxypropylacrylate, 2-hydroxypropylmethacrylate, 2-hydroxy-3-chloropropylacrylate, 2-hydroxy-3-chloropropylmethacrylate, 2,3-dihydroxypropylacrylate and 2,3-dihydroxypropylmethacrylate. The most preferred hydroxyalkylacrylates are 2-hydroxyethylacrylate and 2-hydroxyethylmethacrylate.

The mole ratio of lactone to hydroxyalkylacrylate employed can be selected from a wide range and is often determined by the nature and molecular weight of the macromonomer it is desired to produce. The mole ratio is usually at least 1:1, and is commonly less than 40:1, preferably from 1:1 to 20:1. The molecular weight of the macromonomer produced is often in the range from about 250 to about 10,000 and preferably 300 to 3,000.

The process according to the present invention is carried out in the presence of a free radical inhibitor to prevent or reduce polymerisation of the hydroxyalkylacrylate double bond. Examples of such inhibitors are well known in the art and are commonly selected from substituted phenols such as 4-methoxyphenol or quinones such as hydroquinone, benzoquinone and monomethylhydroquinone. The inhibitor is usually present at a concentration of less than 2000 mg/kg, commonly from 100, preferably from 500 to 1500 mg/kg.

In certain embodiments of the present invention, a solvent is employed in order to facilitate handling of the reaction mixture. Where a solvent is employed, the solvent should not be reactive towards the lactone or the hydroxyalkylacrylate. Examples of suitable solvents include aromatic hydrocarbons such as toluene and xylene, and aliphatic hydrocarbons such as petroleum ethers. In many preferred embodiments, no solvent is employed.

The process according to the present invention is carried out at a temperature of at least 100° C., preferably at least 105° C., and particularly preferably at least 110° C. Preferably, the reaction temperature is not greater than 130° C.

The process according to the present invention is usually continued until substantially all of the lactone has reacted. This can be determined by regular sampling and analysis of the reaction mixture, for example by gas chromatography. In many embodiments, substantially all the lactone is considered to have reacted when the reaction mixture comprises less than 1% w/w of lactone. It will be recognised that the actual reaction time will depend on the conditions being employed, and particularly the reaction temperature and phosphoric acid concentration. Typical reaction times are greater than 3 hours and less than 20 hours, and commonly from 5 to 12 hours.

The process of the present invention can be carried out under an inert, eg a nitrogen atmosphere for at least a part of the time taken to heat the reaction mixture to the desired reaction temperature and reaction time. However, in many embodiments, the process employs an air atmosphere throughout.

The process according to the present invention can be carried out by charging the lactone, hydroxyalkylacrylate and catalyst, plus any free radical inhibitor and/or solvent to a reaction vessel fitted with a heater and a stirrer. The reaction mixture is stirred, heated to the desired reaction temperature and maintained at that temperature until the reaction is complete. The product can be obtained by conventional means, for example in the case of a liquid product, pouring or running off into a suitable reception vessel. This can be effected after cooling, particularly when the product is fluid at room temperature or before cooling, for example when the product is not fluid at room temperature.

According to a preferred aspect of the present invention, there is provided a process for the preparation of macromonomers by the catalysed reaction between ε-caprolactone and a 2-hydroxyethylacrylate, characterised in that the catalyst comprises phosphoric acid at a concentration of 300 mg/kg to 750 mg/kg of reaction mixture and the reaction is carried out at a temperature is from 105° to 130° C. in the presence of from 500 to 1500 mg/kg of a free radical inhibitor.

Having described the invention in general terms, specific embodiments thereof are described in greater detail by way of example only.

EXAMPLE 1

2-hydroxyethylacrylate (371 g), ε-caprolactone (628 g), 4-methoxyphenol (1 g) and phosphoric acid (98% w/w, 0.5 g) were charged to a 1 liter reaction vessel fitted with a mechanical stirrer. The mixture was stirred and heated to 120° C. The reaction mixture was stirred at 120° C. for 8 hours, at which point analysis by gas chromatography indicated that the concentration of ε-caprolactone was <1% w/w, and the reaction was deemed to be complete. The product obtained was a water white liquid having an OH value of 166.2 mg KOH/g and an $H^+$ value of 1.95 mg KOH/g.

COMPARISON 2

The procedure of Example 1 of European Patent Application no 0 108 372 was repeated. The product obtained was an intractable gel having a strong yellow colouration.

EXAMPLES 3 AND 4

The general method of Example 1 was followed, except that the weights of 2-hydroxyethylacrylate (HEA, g) and ε-caprolactone (LACT, g) were as detailed in Table 1 below, and that the reaction was considered to be complete when the concentration of ε-caprolactone was less than 0.5% w/w. The OH value (mg/KOH/g), $H^+$ value (mg/KOH/g) and average molecular weight (MWT) of the products are given in Table 1 below. In each of these Examples, the product obtained was a water white liquid.

TABLE 1

| Example No. | Weight HEA | Weight LACT | H+ value | OH value | MWT |
|---|---|---|---|---|---|
| 3 | 2575 | 2525 | 1.76 | 233.8 | 240 |
| 4 | 1683 | 3317 | 1.95 | 166.7 | 339 |

EXAMPLES 5 to 9

The method of Examples 3 and 4 were followed, except that of 2-hydroxyethylmethacrylate (HEMA) was employed in place of the HEA, and the weights of HEMA (g) and ε-caprolactone were as detailed in Table 2 below. The OH value (mg/KOH/g), $H^+$ value (mg/KOH/g) and average molecular weight (MWT) of the products are given in Table 2 below. In each of these Examples, the product obtained was a water white liquid.

TABLE 2

| Example No. | Weight HEMA | Weight LACT | H+ value | OH value | MWT |
|---|---|---|---|---|---|
| 5 | 466.4 | 1634 | 1.55 | 91.9 | 611 |
| 6 | 2720 | 2380 | 1.28 | 223.4 | 251 |
| 7 | 1854 | 3246 | 1.13 | 150.8 | 372 |
| 8 | 1406 | 3694 | 1.25 | 121.5 | 462 |
| 9 | 1378 | 3622 | 2.85 | 117.1 | 479 |

The results of Examples 1 and 3 to 9 show that the process according to the present invention could successfully be employed to produce a range of different macromonomers having acceptable physical properties, whereas the process of Comparison 2, according to Example 1 of European Patent Application no 0 108 372, produced a product having unacceptable physical properties.

I claim:

1. A process for the preparation of macromonomers by the catalysed reaction between a lactone and a hydroxyalkylacrylate, wherein the catalyst comprises phosphoric acid at a concentration of greater than 200 mg/kg of reaction mixture, and wherein the process is carried out at a temperature of from 100° C. to 130° C.

2. A process according to claim 1, wherein the phosphoric acid concentration is from 300 mg/kg to 750 mg/kg.

3. A process according to claim 1, wherein the phosphoric acid concentration is from 400 mg/kg to 600 mg/kg.

4. A process according to any preceding claim, characterised in that the lactone is ε-caprolactone.

5. A process according to claim 1, wherein the hydroxyalkylacrylate is selected from the group consisting of 2-hydroxyethylacrylate and 2-hydroxyethylmethacrylate.

6. A process according to claim 5, wherein the reaction is carried out at a temperature of 105° C. or greater.

7. A process according to claim 6, wherein the reaction is carried out at a temperature of 110° C. or greater.

8. A process according to claim 1, wherein the reaction is carried out in the presence of a free radical inhibitor at a concentration of from 500 to 1500 mg/kg.

9. A process according to claim 8, wherein the free radical inhibitor comprises 4-methoxyphenol.

10. A process for the preparation of macromonomers by the catalysed reaction between ε-caprolactone and a 2-hydroxyethylacrylate, wherein the catalyst comprises phosphoric acid at a concentration of 300 mg/kg to 750 mg/kg of reaction mixture and wherein the reaction is carried out at a temperature of from 105° to 130° C. in the presence of from 500 to 1500 mg/kg of a free radical inhibitor.

11. A process according to claim 1 wherein said concentration of phosphoric acid is greater than 250 mg/kg.

* * * * *